Dec. 18, 1928.                                          1,695,897
F. J. KRISTOFEK ET AL
AUTOMATIC CALENDAR STITCHER
Filed March 19, 1921          9 Sheets-Sheet 1

Inventors:
Frank J. Kristofek,
Oscar W. Hammerquist.
By
their Attorney

Dec. 18, 1928.　　　　　　　　　　　　　　　1,695,897
F. J. KRISTOFEK ET AL
AUTOMATIC CALENDAR STITCHER
Filed March 19, 1921　　　　9 Sheets-Sheet 2

Inventors:
Frank J. Kristofek,
Oscar W. Hammerquist.
By　　　　　　　
their Attorney.

Dec. 18, 1928. 1,695,897

F. J. KRISTOFEK ET AL

AUTOMATIC CALENDAR STITCHER

Filed March 19, 1921  9 Sheets-Sheet 4

Inventors:
Frank J. Kristofek,
Oscar W. Hammerquist
By
their Attorney.

Dec. 18, 1928.

F. J. KRISTOFEK ET AL

1,695,897

AUTOMATIC CALENDAR STITCHER

Filed March 19, 1921

Inventors:
Frank J. Kristofek,
Oscar W. Hammerquist,
By
their Attorney.

Dec. 18, 1928.

F. J. KRISTOFEK ET AL

1,695,897

AUTOMATIC CALENDAR STITCHER

Filed March 19, 1921

Inventors:
Frank J. Kristofek
Oscar W. Hammerquist
By their Attorney.

Dec. 18, 1928.

F. J. KRISTOFEK ET AL 1,695,897

AUTOMATIC CALENDAR STITCHER

Filed March 19, 1921

Inventors:
Frank J. Kristofek,
Oscar W. Hammerquist.
By Howard Fisk
their Attorney.

Patented Dec. 18, 1928.

1,695,897

UNITED STATES PATENT OFFICE.

FRANK J. KRISTOFEK AND OSCAR W. HAMMERQUIST, OF ST. PAUL, MINNESOTA, ASSIGNORS TO BROWN & BIGELOW, OF ST. PAUL, MINNESOTA, A CORPORATION OF MINNESOTA.

AUTOMATIC CALENDAR STITCHER.

Application filed March 19, 1921. Serial No. 453,793.

Our invention relates to automatic calendar stitchers, the primary object of which is to provide means to automatically stitch the calendar pads to the back with wire stitches in a uniform manner to facilitate means for stitching a large number of calendars in a short time and eliminating a great deal of manual labor. When the calendar pad is stitched to the back it is essential that it be placed centrally and in a uniform position in relation to the border of the back to make up a calendar with a neat appearance and to hold the calendar pads stationary with the back until they are stitched with the wire stitches by manual operation, is a slow and unaccurate process.

Our invention is designed to automatically place and hold a calendar pad in position above the back so that each pad will be placed in the same position on the back and while the pad is held in the desired position it is automatically stitched to the back with the stitches uniformly positioned in relation to the pad and back so as to stitch one or more calendars with the same accuracy in a rapid manner and to discharge the calendars in a finished form.

The calendar backs and the calendar pads are individually fed into the machine automatically and separate of each other, being squared with the pad in a manner to properly position the same in relation to the back so that when the pads are stitched each and every calendar is discharged from the machine with the pads and stitches uniformly positioned on the back. This facilitates handling the calendars very rapidly and eliminates a large amount of manual labor, which is always inclined to be inaccurate, especially when it is desired to turn out a large number in a short time.

The invention includes means for holding the calendar pads collectively with feeding means adapted to feed the same individually into position to be stitched to the back while the feeding means engages the calendar back simultaneously with placing the pad in position to be stitched to square the back in relation to the pad. This operation takes place during a momentary stopping of the calendar back as it passes through the machine.

In the drawing forming a part of this specification.

In the drawings A represents our automatic stitching machine which is provided with a stitching head B of ordinary construction for stitching pads with wire stitches, the head being held in position by the forwardly projecting arm 10 through which the main shaft 11 for operating the stitcher extends. The shaft 11 is operated by the chain drive 12, which connects with the drive shaft 13. The stitcher B receives stitching wire from the spools 14 so that in operation sufficient wire is supplied by the spools to the stitching head for making a large number of stitches.

The shaft 13 is the main drive shaft of the machine A and is driven by the motor C by the belt 15, which is enclosed in the guard 16. A hand operating wheel 17 is secured to the operator side or front of the machine A so that parts of the machine can be rotated by hand when desired in setting or starting the operation of the machine A.

A calendar back holding and feeding table D is secured at an inclined position to one end of the machine A, the incline of which is adjustable by the supporting bracket arm 18 to position the calendar backs 19 at an incline on the table D to feed the backs into the machine individually in the desired manner. At the opposite end of the machine A a receiving table E is secured which is positioned at an incline in a manner to receive the finished calendars 20 as they are discharged from the stitching machine A.

Figure 11:
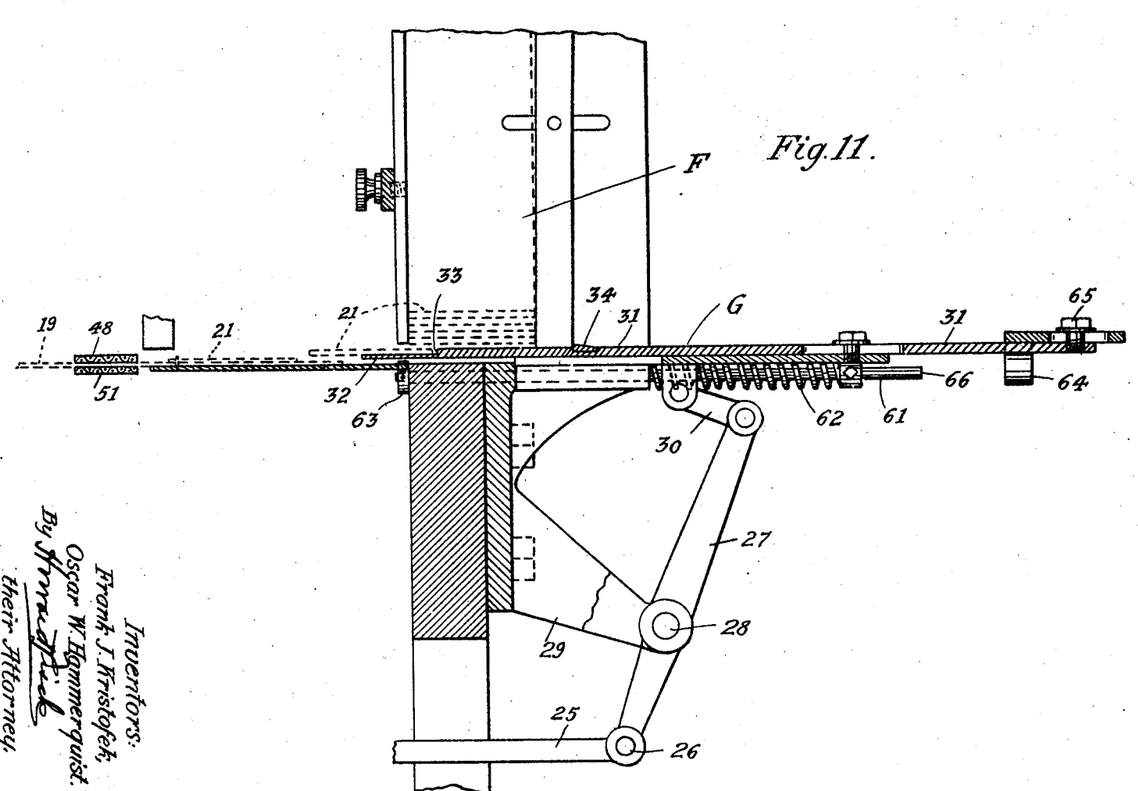
Figure 11 is an enlarged side elevation of the detail portion of the calendar pad holder, illustrating the feeding mechanism.
Figure 12:
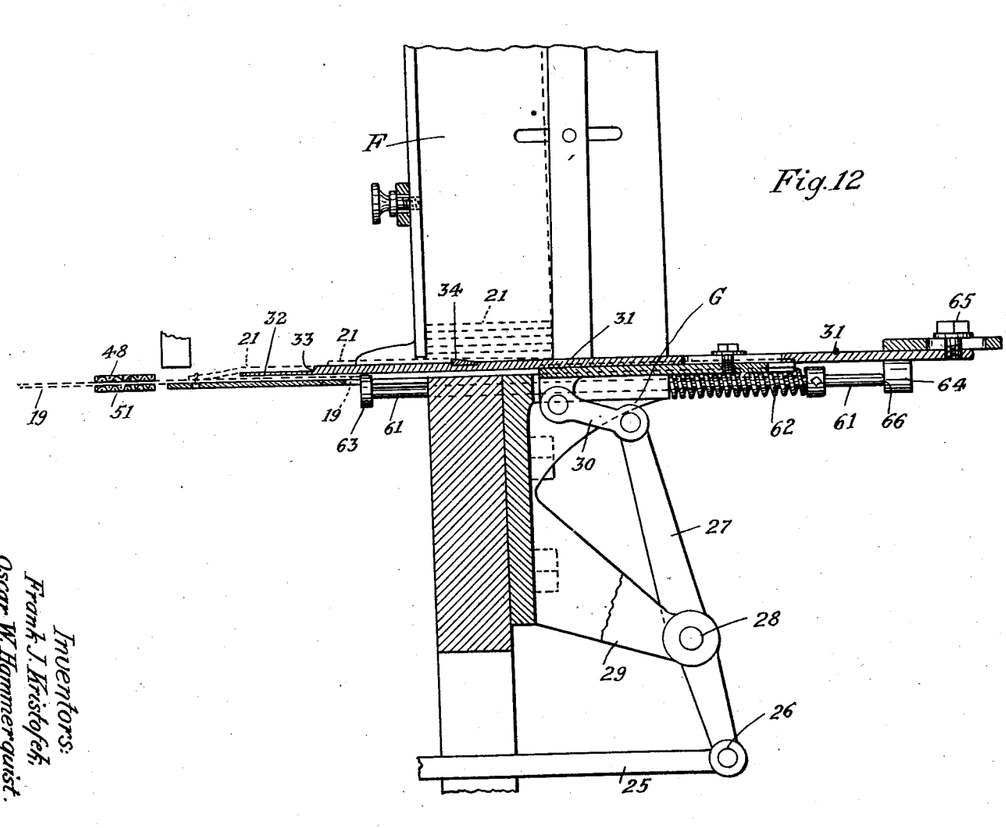
Figure 12 is a similar view to Figure 11 illustrating the parts in a different position.

Approximately central between the receiving and discharge ends of the machine A a monthly calendar pad holding compartment F is positioned at the front of the machine A, directly in front of the stitching head B. A series of calendar pads 21 are held collectively in the compartment F in a manner so that they can be readily fed individually to a position above the calendar back 19 by the pad feeding means G which is operable beneath the pads to feed them into the desired position. The pad feeding means G is operated by the shaft 22 which is connected with the drive shaft 13 by the gears 23 and extends longitudinally of the machine A beneath the calendar back feeding mechanism. A cam 24 is secured in the ordinary manner to the shaft 22 and operates the rod 25 which is connected by a suitable strap to the cam 24 on one end while the other end of the rod is pivotally connected at 26 to the pad feeding means operating arm 27. The lever 27 is pivoted between its ends at 28 to a suitable bracket 29 and is connected by the link 30 to the pad feeding tongue 31. The forward end of the tongue 31 is cut away to form a thin flat plate-like engaging end 32 with a notch 33 at the back of the same which is adapted to individually engage the calendar monthly pads 21. Thus during the operation of the machine A the shaft 13 will rotate the shaft 22, which in turn operates the rod 25 to reciprocate the lever 27 back and forth which operates the tongue 31 in a manner to feed the pads 21 out of the compartment F into position to be stitched to the calendar backs 19. A second monthly pad engaging shoulder 34 is formed on the tongue 31 which engages one of the pads 21, as illustrated in Figure 12, to push it forward when the tongue 31 is in extreme forward position. This shoulder forces the pad at the bottom of the series in the compartment F into position ready to be engaged by the notch 33 when the feeding tongue 31 moves back into rear-most position, as illustrated in Figure 11. The enlarged illustrations of the feeding mechanism G and calendar monthly pad holding compartment F in Figures 11 and 12 clearly illustrate the construction of the feeding mechanism with the parts in the different operating positions.

Figure 10:
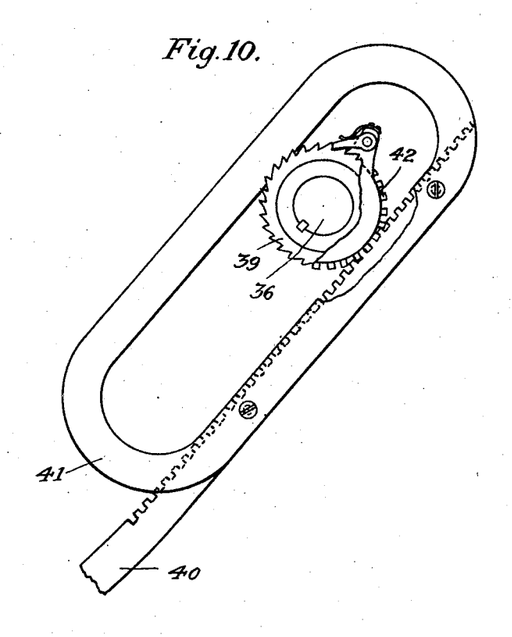
Figure 10 is a detail of the feeding ratchet mechanism of the stitcher.

The back feeding means H comprises the feeding rollers 35 which are secured to the shaft 36 so as to operate above the spacing belt 37 which is positioned about the rollers 38 directly beneath the feeding rolls 35. This feeding means is of ordinary construction being formed in a manner to feed a single back 19 at a time into the machine A and to prevent more than one back being fed therein. The shaft 36 is operated by the ratchet mechanism 39. The rack 40 is held by the loop 41 into engagement with the gear 42 of the ratchet mechanism as illustrated in Figure 10. The rack 40 is operated by the lever 43 which is pivoted at 44 and the free end of which carries a cam engaging roller 45. The lever 43 is operated by the cam 46 which is secured to the operating shaft 13 while the roller 45 of the arm 43 is held by the spring 47 into engagement with the cam 46. During the operation of the machine A the feeding mechanism H will be operated intermittently by the cam 46 and the lever arm 43, which operates the ratchet mechanism 39.

Figure 1:
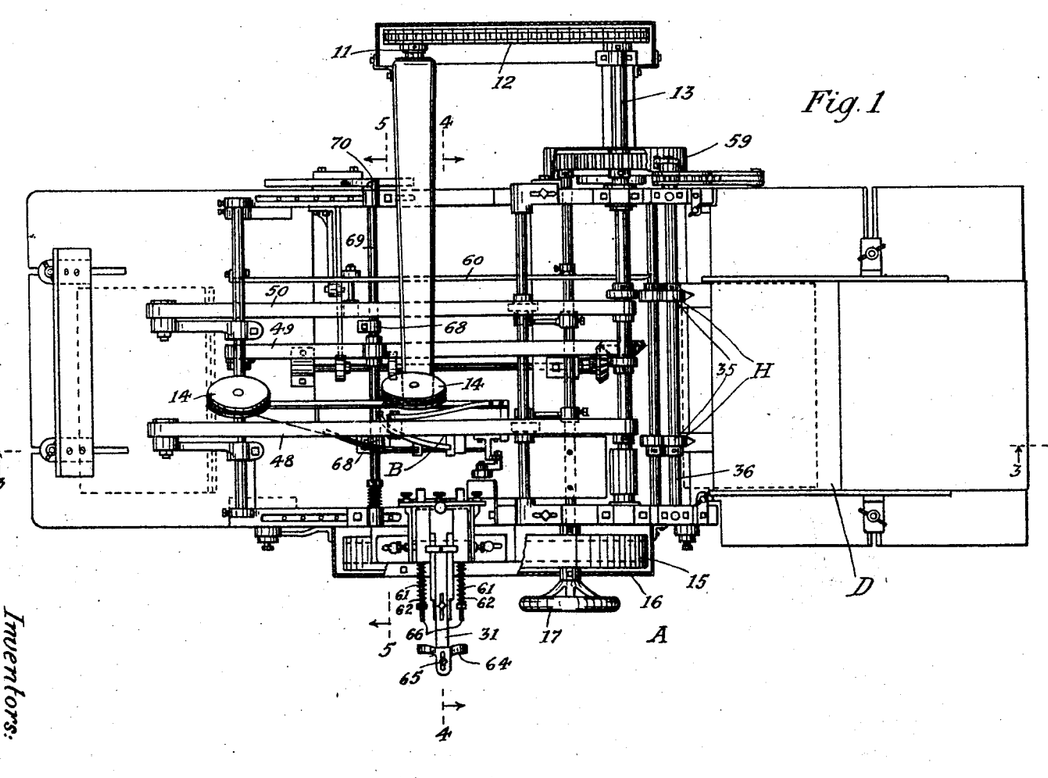
Figure 1 is a plan view of our automatic calendar stitcher.
Figure 2:
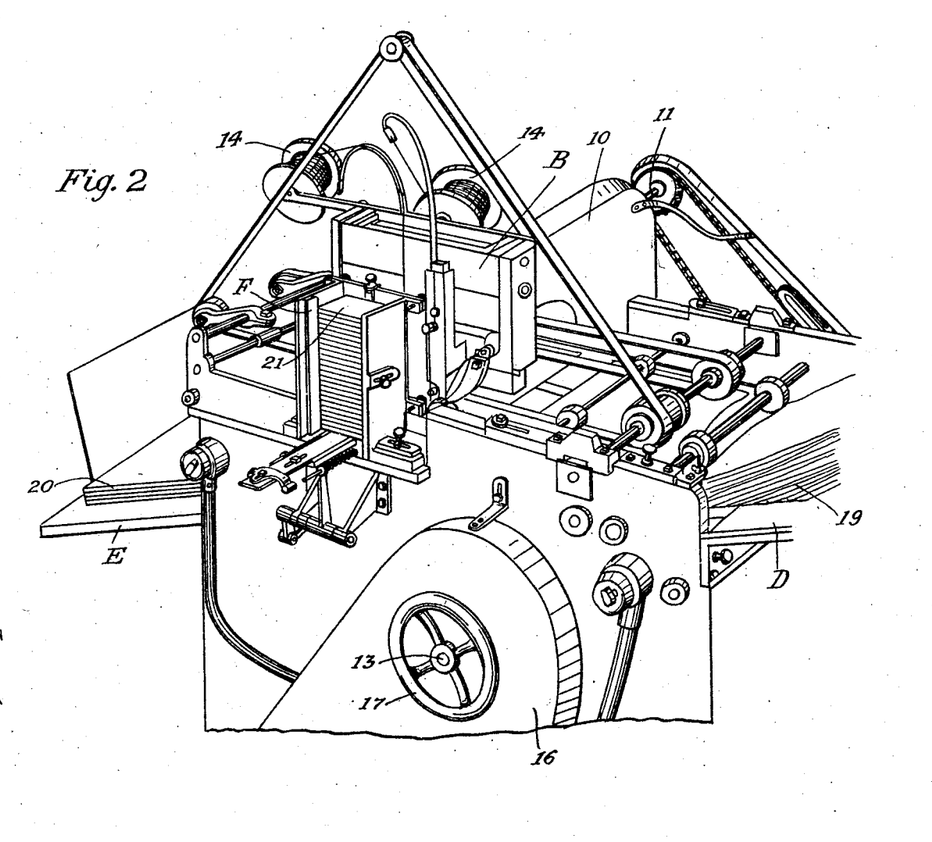
Figure 2 is a perspective view of a portion of the same.

When the calendar backs 19 are fed into the machine A they are picked up by a series of feeding tapes 48, 49 and 50, which aline with the adjacent lower feeding tapes 51, 52 and 53 respectively. These tapes are operated by the driving shafts 54 and 55 which operate in unison by means of the gears 56 and 57, the gears 56 and 57 meshing with each other while the gear 57 meshes with the driving gear 58, which is secured to the driving shaft 13. These gears are all enclosed within the casing or guard 59, illustrated in Figure 1, in the ordinary manner. The feeding tapes carry the backs 19 into and through the machine.

The calendar backs 19 are fed rapidly into the machine A so as to be engaged by the feeding tapes and while they ordinarily pass in line through the tapes it is essential that suitable gauges operate quickly to aline them into the proper position beneath the stitching head B against the longitudinally extending guard or stop 60 which extends along one side of the feeding tapes and is adjustably positioned to accommodate various lengths or sizes of the calendar backs 19. The back positioning arms or stops 61 are secured beneath the pad receptacle F and are held normally in backward position by the coil springs 62 with the back engaging ends 63 withdrawn and adapted to form a shoulder to limit the backward movement of the stops 61. The transversally extending member 64 is adjustably secured by the screw 65 to the outer end of the pad feeding tongue 31 in position to engage the outer ends 66 of the movable stop 61. The member 64 is positioned on the tongue 31 in a manner so that when the tongue is in its backward or withdrawn position as illustrated in Figure 11, the member 64 is out of engagement and spaced from the end 66 of the stop 61. Thus when the tongue 31 is operated by the lever 27 it can be moved forward for some distance before the member 64 engages the end 66 to operate the stops 61. The purpose of this is to position the member 64 so that the end 63 will engage the edge of the calendar backs 19 at the end of the stroke of the feeding tongue 31 just at the moment that the pad 21 is positioned in the proper relation to the back 19 to be stitched thereto. In this moment the stitching mechanism of the head B is adapted to be operated so as to stitch the pad 21 to the back 19 in the ordinary well known manner of wire stitching mechanism.

It is essential that the calendar back 19 be held stationary at the moment it is being stitched and we provide suitable stops 68 which are adjustably secured to the transversely extending shaft 69 in the path of the travel of the calendar backs 19. The shaft 69 is adjustable longitudinally of the machine A while the stops 68 are adjustable longitudinally of the shaft 69, thus allowing the stop 68 to be positioned at the desired point to engage the calendar backs of different sizes which may be passed through the machine A. The shaft 69 is rotated so as to operate the stop 68 by the belt crank lever 70 which is secured to one end of the shaft, the free end of which is provided with anti-friction roller which engages against the horizontally extending operating member 71. The member 71 has a long engaging surface for the anti-friction roller at the free end of the arm 70 to allow the operation of the stops 68 in their various positions. The operating member 71 is provided with a downwardly extending portion 72 which is pivotally connected at 73 to an operating lever arm 74. The lever 74 is pivotally secured between its ends 75 to the supporting bracket 76 while the free end of the lever is provided with an anti-friction roller 77 which is adapted to engage against the operating cam 78 that is secured to the shaft 22.

Figure 3:
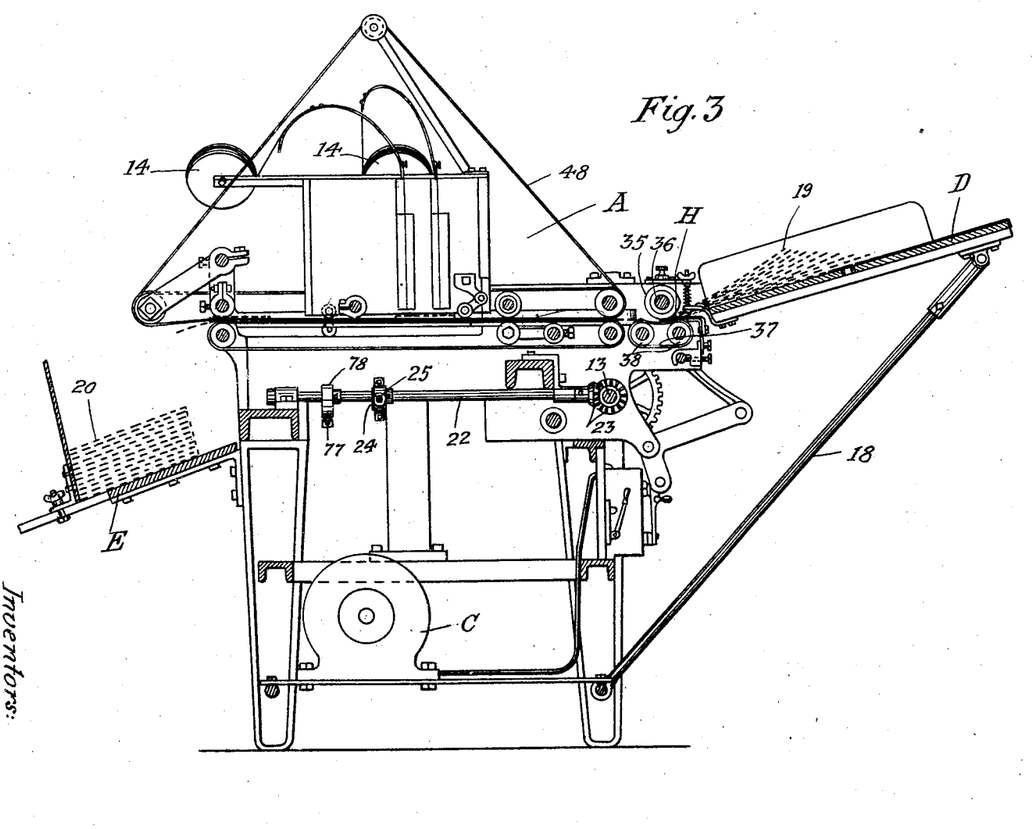
Figure 3 is a sectional side elevation of our stitcher on the line 3—3 Figure 1.
Figure 4:
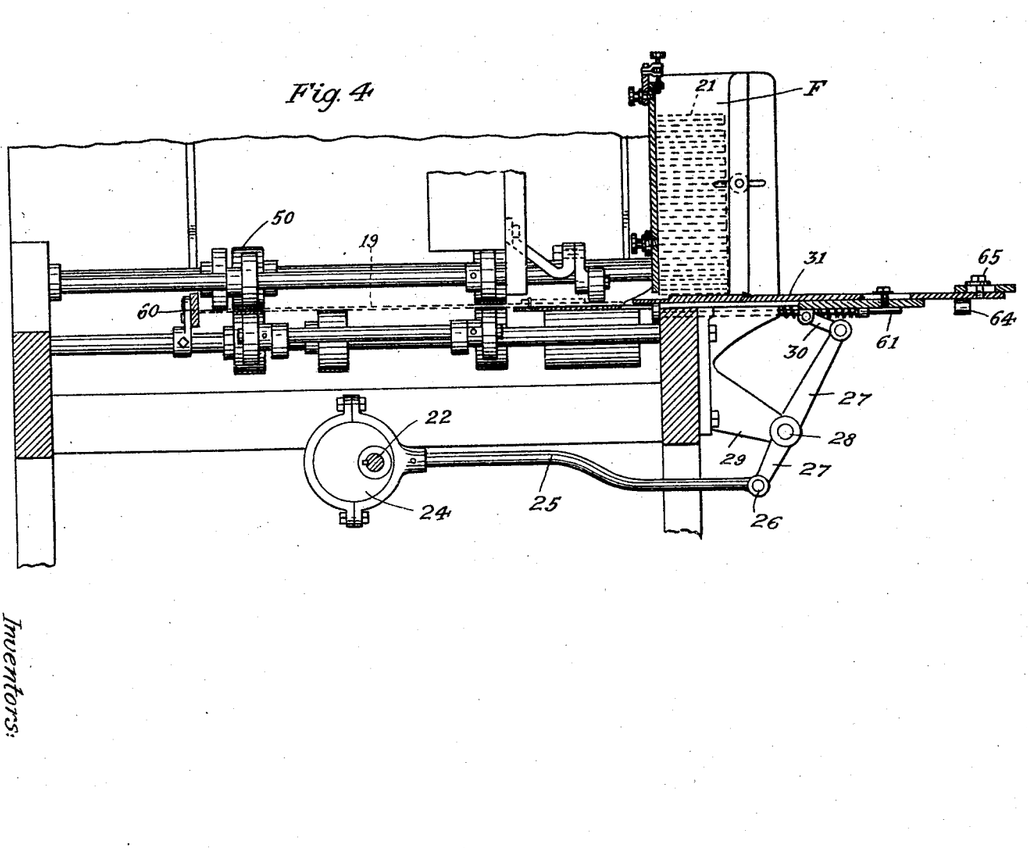
Figure 4 is a transverse section of the stitcher a portion of which is broken away and illustrating the monthly pad holding and feeding means on the line 4—4, Figure 1.
Figure 5:
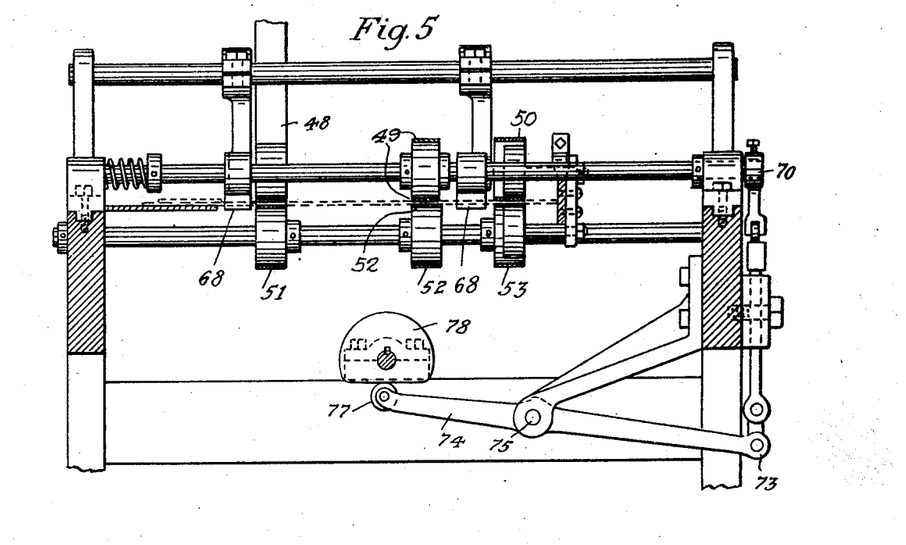
Figure 5 is a transverse cross section of the stitcher, only a portion of which is illustrated, showing the stop operating means for holding the calendar back stationary momentarily in the stitcher on the line 5—5, Figure 1.
Figure 6:
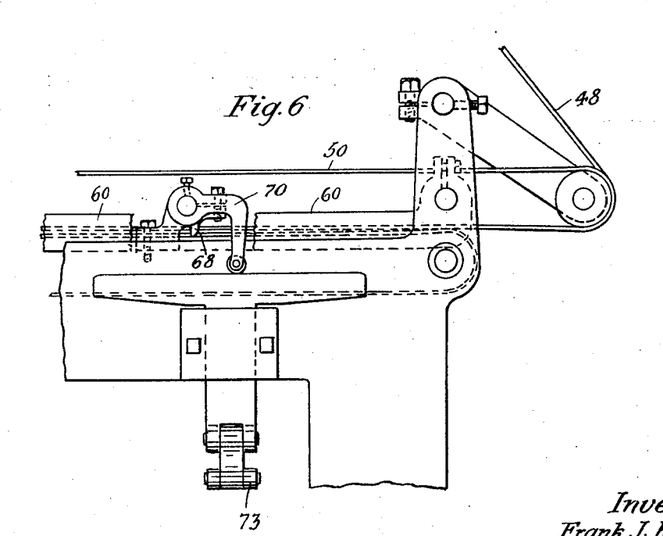
Figure 6 is a detail side elevation of a portion of the stop operating means illustrated in Figure 5.
Figure 7:
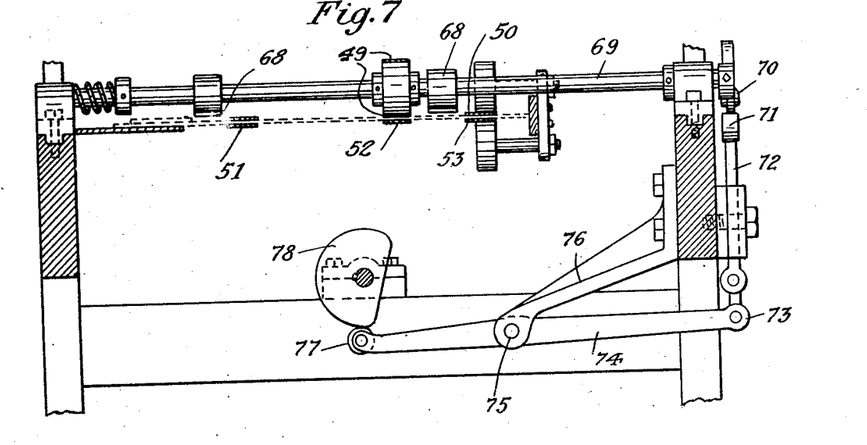
Figure 7 is a view similar to Figure 5 with the parts in a different position.
Figure 8:
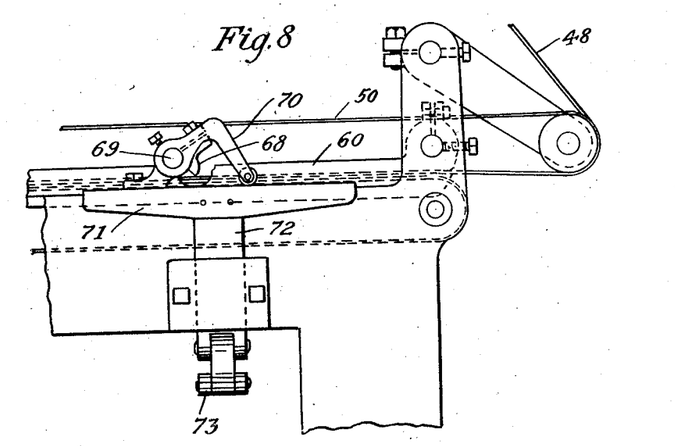
Figure 8 is a view similar to Figure 6 with the parts in a different position.
Figure 9:
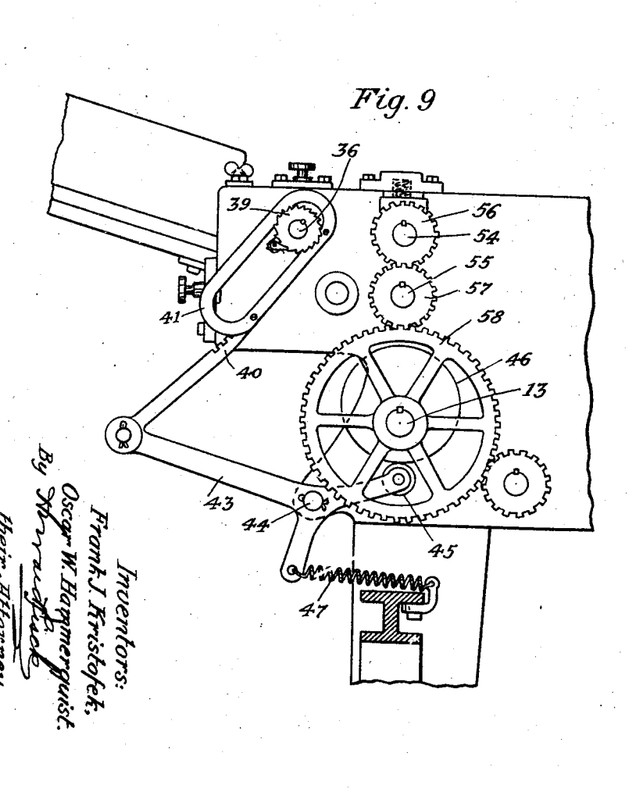
Figure 9 illustrates a detail side elevation of a portion of the stitcher showing some of the driving gears.

In the course of the operation of the machine A the stops 68 are dropped into the position illustrated in Figure 6 in the path of movement of the calendar backs 19 to engage the same and to hold them momentarily at the moment that the stitcher is timed to operate to stitch the calendar pad 21 to the back. As soon as the stitcher has operated the stops 68 are released by the member 71 which forces the lever crank 70 upward and moves the stops 68 out of position of the path of travel of the backs, allowing the feeding tapes to carry the same out of the machine A and discharge it into the receiving receptacle E in a finished form as the calendars 20 illustrated in Figure 3. The releasing position of the stops 68 is clearly illustrated in Figure 8 and it is essential that these stops be operated quickly and timed so as to operate in unison with the stitching mechanism in the head B so that the stitched calendar can be discharged in finished form out of the machine while another back 19 with the pad 21 are brought into position to be stitched.

All of the parts of the machine A are timed with relation to each other so that each element functions to give the desired results and in this manner the calendar backs 19 are passed rapidly into position to be stitched while the pads are fed to a position in relation to the back so that each and every calendar when discharged from the machine in its finished form is uniformly stitched with the wire stitches accurately spaced apart and in the same position as each and every calendar. Our machine A has been operated in a manner to stitch more than fifty thousand calendars a day and as this work was accomplished heretofore by other manual labor which is bound to be uncertain and inaccurate the merit and advantage of the operation and work of our machine is readily apparent. The machine A can be operated by one or two operators to accomplish as much work as more than fifteen individual operators with other means, thus affording a great saving of time, labor and expense and accurately stitching each and every calendar.

The essential features of the invention are the automatic feeding of the calendar backs and the calendar pads into the machine, the means for automatically spacing and positioning the pads and the back and to automatically discharge the finished calendars out of the machine.

We have illustrated our invention in the accompanying drawings in a particular arrangement and construction of parts, but we desire to have it understood that this is only illustrative and that the invention can be carried out by other means and applied to uses other than those above set forth within the scope of the following claims.

Having described our invention we claim:

1. A device of the class described comprising, a unit stitching head, a belt carrying means associated with said head in a manner to convey articles there between in a flat plane to be stitched by said stitching head and carried to and from said stitching head, a longitudinally extending stop gauge, and means for stopping the articles and simultaneously moving the same into engagement with said longitudinally extending stop gauge to hold the articles stationary momentarily in a set position when being stitched, said belt means continuing in operation to move said articles along said longitudinal stop gauge when released.

2. In a stitching device comprising a stitching means, continuously operating conveying means for conveying articles to and past said stitching means, a stationary gage, and means cooperating with said stationary gage to adjust said articles for said stitching means.

3. In a stitching device including a feeding table at one end, a stitching means, a belt conveyor extending past said stitching means in a manner to carry articles between the belts of the conveyor to and from said stitching means, transverse stop means interposed in the path of said articles, longitudinal stop means extending along one side of the articles, reciprocating means cooperating with said longitudinal stop means to align the articles longitudinally and together with said transverse stop means hold the articles stationary while said stitching means is in operation and said conveyor continues to operate, and means for automatically releasing said stop means to allow said conveying means to pick up and discharge the article as it is stitched out of said device.

4. An automatic stitcher comprising wire stitching means, continuously operating conveying means including a series of endless belts between which articles are conveyed, stop means adapted to move into the path of the article conveyed to align the article transversely, and means cooperating with both longitudinal edges of the article for aligning the article longitudinally.

5. An automatic stitching device, including a wire stitching means, a pair of upper and lower endless conveyors associated with said stitching means in a manner to convey sheets to and from said stitching means, sheet feeding means at one end, means for automatically operating said sheet feeding means intermittently to feed one sheet at a time to said conveyor, rotatable transverse stop means to stop the sheets at said stitching means adapted to lift up to release the sheets, squaring means moving the individual sheets transversely to square the same at the stitching point, longitudinal guide means against which the sheets are squared, and a receiving table at the opposite end to the sheet feeding means for receiving the sheets as they are discharged individually from the stitcher.

6. A device of the class described comprising, a stitching head, pairs of endless belt conveyors positioned beneath said head and extending on either side thereof, a sheet feeding table on one end of said conveyor, means for feeding the sheets from said table to said conveyor in a manner to carry the sheets between said conveyor and pass them beneath said stitching head, a sheet receiving table at the other end of said conveyor, a stop associated with said conveyor including a rotatable shaft having a pair of stop lugs adjustably positioned thereon, and means for rotating said shaft to carry said lugs into operating position.

7. The combination of a wire stitcher having a plurality of stitching means, continuously operating sheet conveying means, intermittently operable sheet feeding means, rotatable means adapted to intercept the path of travel of sheets in said conveying means to hold the sheets momentarily stationary, a longitudinally extending gauge associated with said stopping means, and sheet engaging means operable in unison with said sheet stopping means in a manner to square the sheets against said gauge and stopping means just previous to the operation of said stitching means.

8. The combination of an intermittently operated wire stitcher, continuously operating conveying means, stop means interposed in the path of said conveying means, a longitudinally extending gauge, and means adapted to engage articles carried by said conveying means and push them against said longitudinally extending gauge to cause a uniform stitching of the articles carried by said conveying means, while said stop means acts as a gauge for one side of the articles carried by the conveyor.

9. A device of the class described, comprising endless feeding conveyors associated together in a manner to carry sheets between the same, the conveying portion of said conveyors extending approximately in a straight plane to permit cardboard sheets to be passed straight through said conveyor, a feeding means associated with one end of said conveyors, a receiving table associated with the other end of said conveyor, a stitching head interposed between the ends of the conveying portion of said conveyor, stop lugs positioned adjacent said stitching head, and means for operating said stop lugs in a manner to cause the same to be lifted simultaneously to release the card board sheets passing through said conveyors without bending the cardboard.

10. A device for stitching calendar pads to calendar backs, including endless belt conveyors adapted to extend in approximately a straight plane throughout the conveying portion thereof, an inclined feeding table, calendar back feeding means adapted to feed calendar backs from said table directly into said conveyor, a receiving table positioned below the discharge end of said conveyor, a stitching means, means for stopping the calendar backs momentarily while being stitched, means for pushing the calendar backs into position to be stitched at the time of operation of said stopping, and means to square the calendar backs as they are individually pushed into position before they are stitched.

11. A calendar back stitching device, including a stitching head, conveyors associated with said stitching head in a manner to convey calendar backs to and from said stitching head, stops associated with said conveyor, means for raising said stops, a longitudinally extending guide, and means for pushing the calendar backs against said guide to square the same.

12. A calendar stitching device including a stitching head, a conveyor associated with said head, a feeding table, a receiving table, stop members interposed in the path of travel of calendars carried by said conveyor, means for simultaneously operating said stops to raise and lower the same, shifting means adapted to shift the calendars transversely in said conveyor to individually place each calendar in the same relative position with the stitching head in a manner to cause the stitching to be approximately in the same place in each calendar, and a stationary member against which said shifting means is adapted to push the calendars.

13. A calendar stitching device including a feeding table, a delivery table, a straight conveyor extending between said feeding and delivery tables, a stitching means interposed between said tables, said conveyor adapted to be operated continuously, stop lugs positioned to hold calendars stationary momentarily in said conveyor, a horizontally extending shaft extending through said conveyor adapted to carry said stop lugs, means for rotating said shaft in a manner to lift said stop lugs to permit the calendars to be carried to said delivery table, a guide extending longitudinally with said conveyor, and means operating transversely of said conveyor in a manner to square the calendars against said stopping lugs and guide just prior to the stitching operation whereby each calendar is stitched in the same relative position.

14. A device for stitching calendar pads to calendar backs, including conveyor means, a stitching means, means for stopping the calendar back while being stitched, means including a stationary member and a movable member for squaring the calendar backs in said conveyor at the moment of stopping, as they are individually pushed into position before they are stitched.

FRANK J. KRISTOFEK.
OSCAR W. HAMMERQUIST.